United States Patent Office 2,965,635
Patented Dec. 20, 1960

2,965,635

NORLEUCINE DERIVATIVES AND PROCESS FOR PRODUCING SAME

Alexander M. Moore, Grosse Pointe Farms, and Horace A. De Wald, Grosse Pointe Woods, Mich., assignors to Parke, Davis & Company, Detroit, Mich., a corporation of Michigan No Drawing. Filed Jan. 15, 1958, Ser. No. 708,968

9 Claims. (Cl. 260—239)

This application is a continuation-in-part of our co-pending applications Serial Number 530,486, filed August 25, 1955, now abandoned, and Serial Number 570,418, filed March 9, 1956 and the invention relates to a process for producing 6-diazo-5-oxonorleucines and to certain intermediate norleucine derivatives produced in said process.

In accordance with the invention 6-diazo-5-oxonorleucines which have the formula,

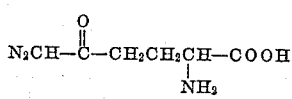

are produced by reacting a 6-amino-5-oxonorleucine, preferably in acid addition salt form, in an aqueous modium below room temperature with a diazotizing agent. This transformation can be illustrated as follows:

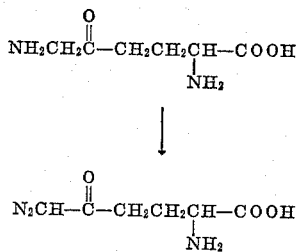

From the formulas given above it will be seen that the 6-diazo-5-oxonorleucines exists in the optically active D and L forms as well as the optical racemic DL form and that the same is true of the intermediate and starting products used in the preparation of these substances. It is to be understood that the formulas throughout the specification and claims, in the absence of a designation to the contrary, represent the D-optical isomer, the L-optical isomer or the DL-optically inactive form of the chemical compounds. The same convention, in the absence of a designation to the contrary, is to be applied to the chemical names appearing in the specification and claims. Thus, where a chemical name does not specify which optical isomer is intended, the name is to be interpreted in its generic sense, that is, as meaning either the D-optical isomer, the L-optical isomer or the optically racemic DL-form.

Various diazotizing agents can be used in the aforementioned diazotization reaction. For example, nitrous acid, alkyl nitrites and nitrosyl compounds can be used. When employing nitrous acid as a diazotizing agent, one can use a solution of the nitrous acid (prepared by the reaction of nitrogen trioxide with water) or the nitrous acid can be generated in situ by the addition of a mineral acid and an inorganic nitrite such as the alkali metal or alkaline earth metal nitrites and heavy metal nitrites. Some specific examples of such inorganic nitrites are sodium nitrite, potassium nitrite, barium nitrite, silver nitrite and the like. Since the free amino acid, 6-amino-5-oxonorleucine, is relatively unstable, it is desirable to employ 6-amino-5-oxonorleucine in acid addition salt form. The reaction is carried out at pH 4 to 7, preferably 5 to 6. Where the acid addition salt is employed it is preferable not to add a mineral acid to the reaction mixture but to merely allow the salt to react with the nitrite to produce nitrous acid in situ. The nitrous acid can also be produced in situ by bubbling nitrogen trioxide through an aqueous reaction mixture. In addition, nitrous acid may be prepared by utilizing a nitrate and then adding a reducing substance such as arsenious acid to the reaction mixture. Some example of the alkyl nitrites which can be used as a diazotizing agent are ethyl nitrite, butyl nitrite, and amyl nitrite. Some examples of the nitrosyl compounds which can be used in the process are nitrosyl chloride, nitrosyl bromide and nitrosyl sulfuric acid. The quantity of diazotizing agent used in the process is not particularly critical but, for reasons of economy, at least one equivalent should be used for each equivalent of 6-amino-5-oxonorleucine starting material. Best results are obtained when an excess of a diazotizing agent is used, and even though it is desirable to diazotize only one of the two amino groups present in the 6-amino-5-oxonorleucine starting material, as much as three to four equivalents of the diazotizing agent can be used without deleterious effect upon the yield of the desired product.

The 6-amino-5-oxonorleucines (alternatively designated as 5-oxolysines) and their acid addition salts are new compounds which in the free base form have the formula,

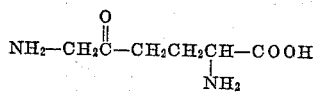

The invention also contemplates the 6-amino-5-oxonorleucine compounds and their production by acid hydrolysis of a lower alkyl ester of 2,6-diphthalimido-5-oxocaproic acid. The method of production is carried out by treating the starting material with at least two equivalents, and preferably more than two equivalents, of mineral acid. For best results, 3 to 10 normal aqueous mineral acid is employed. The reaction is carried out at a temperature above 70° C. and preferably at reflux temperature. Mineral acids, such as hydrochloric acid, hydrobromic acid, sulfuric acid, phosphoric acid and the like, can be used. The resulting acid addition salt of 6-amino-5-oxonorleucine can be purified, if desired, by converting to the corresponding free base and isolating as a relatively insoluble salt such as the picrate.

The 6-diazo-5-oxonorleucines produced by the process of the invention possess phytotoxic and other interesting properties. They are particularly useful as herbicides, deweeding agents and the like. For this purpose, a dilute aqueous solution is employed and the solution applied to the plant or plant crop in accordance with methods which are known in the art. The compounds are effective in high dilution and in addition have a selective action against certain undesirable weed species. For example, in the case of L-diazo-5-oxonorleucine, an aqueous solution at a concentration of 1,000 parts per million applied in a spray to the point of drip off to separate vigorously growing test plots of lambsquarter and pigweed gives 100% kills whereas the growth of a comparable plot of corn is inhibited to the extent of only 20% under identical conditions. The 6-amino-5-oxonorleucines and their acid addition salts with which this invention is concerned are useful as intermediates for the production of the 6-diazo-5-oxonorleucines. The method by which these compounds can be converted to the 6-diazo-5-oxonorleucines has been described above.

3

The invention is illustrated by the following examples:

Example 1

A mixture of 5.2 g. of DL-2,6-diphthalimido-5-oxocaproic acid, methyl ester [Sheehan and Bolhofer, J. Am. Chem. Soc., 72, 2469 (1950)] and 130 ml. of concentrated hydrochloric acid (sp. g. 1.18) is stirred and heated under reflux temperatures for sixteen hours. Three 20 ml. portions of concentrated hydrochloric acid (sp.g. 1.18) are added at intervals during this period. The mixture is cooled for sixteen hours at 0° C. and filtered. The filtrate is concentrated in vacuo to a volume of 40 ml. and the concentrate is extracted several times with ether. The pH of the aqueous solution is adjusted to 7 to 8 with 4 normal sodium hydroxide, and the solution is warmed to 60° C. and added rapidly with swirling to a hot solution of 9 g. of picric acid in 100 ml. of water. The product which separates is collected by filtration, washed well with water and ethanol and then dried in vacuo; M.P. 166–168° C. The product, which is the picric acid addition salt of DL-5-oxolysine, has the formula,

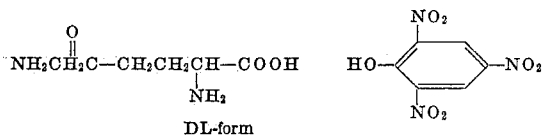

DL-form

The picrate salt is converted to the dihydrochloride by warming the material for thirty minutes in 40 ml. of concentrated hydrochloric acid (sp.g. 1.18). The mixture is cooled well and then filtered to remove the picric acid. The filtrate is extracted repeatedly with equal volumes of ether, treated with charcoal, filtered, the filtrate is frozen and the ice sublimed from the frozen mass under high vacuum. The solid residue is dissolved in 8 ml. of hot water, 35 ml. of absolute ethanol is added and the crystalline product is removed by filtration; M.P. 109–112° C. This product, DL-5-oxolysine, dihydrochloride monohydrate, has the formula,

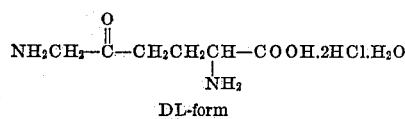

DL-form

A solution of 250 mg. of DL-5-oxolysine, dihydrochloride, and 10 ml. of water is cooled to 0–5° C. in an ice bath. A solution of 140 mg. of sodium nitrite in 2 ml. of water is added in one portion and the yellow solution is cooled for ten minutes in the ice bath. The reaction mixture is then frozen and the ice is sublimed from the frozen mass under high vacuum. The residual product, DL-6-diazo-5-oxonorleucine, which has the formula,

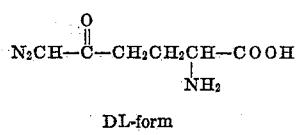

DL-form can be purified by dissolving in 10 ml. of water containing 10 ml. of 1% aqueous acetone, pouring the solution into an adsorption column containing 15 g. of activated carbon and 15 g. of diatomaceous earth, washing the column with approximately 2.5 hold-up volumes of 1% aqueous acetone and collecting the eluate in 10 ml. fractions. The three fractions showing the strongest ultraviolet absorption at a wave-length of 275 millimicrons are frozen and the ice sublimed from the frozen mass under high vacuum. The residual product, DL-6-diazo-5-oxonorleucine, is recrystallized by dissolving in several drops of water and adding five volumes of absolute etha-

4 nol. The ultraviolet absorption spectrum of the product shows two maxima, one of $$E^{1\%}_{1\,cm.} = 683$$

at 274 millimicrons and another of $$E^{1\%}_{1\,cm.} = 376$$

at 244 millimicrons.

Example 2

A solution of 1 g. of L-5-oxolysine dihydrochloride (prepared as described in Example 1 from L-2,6-diphthalimido-5-oxocaproic acid methyl ester) in 40 ml. of water is cooled to 0° C. and a solution of 560 mg. of sodium nitrite in 8 ml. of water added quickly with stirring. The mixture is allowed to stand for ten or fifteen minutes in an ice bath and then frozen. The ice is sublimed from the frozen mass under high vacuo. The residual L-6-diazo-5-oxonorleucine is purified by dissolving it in 40 ml. of water containing 40 ml. of 1% aqueous acetone and pouring the solution into an adsorption column containing 60 g. of activated carbon and 60 g. of diatomaceous earth. The column is washed with about 3 hold up volumes of 1% aqueous acetone and the fractions showing the strongest ultraviolet adsorption at 275 millimicrons collected and combined. The fractions are frozen and the ice removed by sublimation in vacuo. The residual L-6-diazo-5-oxonorleucine is purified by recrystallization from five volumes of absolute ethanol containing a few drops of water. The ultraviolet absorption spectrum of the product shows two maxima, one of $$E^{1\%}_{1\,cm.} = 683$$

at 274 millimicrons and one of $$E^{1\%}_{1\,cm.} = 376$$

at 244 millimicrons.

Example 3

A solution of 1 g. of D-5-oxolysine dihydrochloride (prepared as described in Example 1 from D-2,6-diphthalimido-5-oxocaproic acid methyl ester) in 40 ml. of water is cooled to 0° C. and a solution of 560 mg. of sodium nitrite in 8 ml. of water added quickly with stirring. The mixture is allowed to stand for ten or fifteen minutes in an ice bath and then frozen. The ice is sublimed from the frozen mass under high vacuo. The residual D-6-diazo-5-oxonorleucine is purified by dissolving it in 40 ml. of water containing 40 ml. of 1% aqueous acetone and pouring the solution into an adsorption column containing 60 g. of activated carbon and 60 g. of diatomaceous earth. The column is washed with about 3 hold up volumes of 1% aqueous acetone and the fractions showing the strongest ultraviolet adsorption at 275 millimicrons collected and combined. The fractions are frozen and the ice removed by sublimation in vacuo. The residual D-6-diazo-5-oxonorleucine is purified by recrystallization from five volumes of absolute ethanol containing a few drops of water. The ultraviolet absorption spectrum of the product shows two maxima, one of $$E^{1\%}_{1\,cm.} = 683$$

at 274 millimicrons and one of $$E^{1\%}_{1\,cm.} = 376$$

at 244 millimicrons.

We claim:

1. A compound of the class consisting of a free base and its acid addition salts, said free base having the formula,

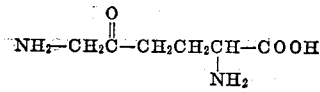

2. DL-6-amino-5-oxonorleucine dihydrochloride monohydrate.
3. L-6-amino-5-oxonorleucine dihydrochloride.
4. D-6-amino-5-oxonorleucine dihydrochloride.
5. DL-6-amino-5-oxonorleucine picrate.
6. Process for the production of 6-diazo-5-oxonorleucine which comprises reacting an acid addition salt of 6-amino-5-oxonorleucine with a diazotizing agent.
7. Process according to claim 6 wherein the reaction is carried out below room temperature in an aqueous medium.
8. Process for the production of 6-amino-5-oxonorleucine acid addition salts which comprises subjecting a lower alkyl ester of 2,6-diphthalimido-5-oxocaproic acid to acid hydrolysis in an aqueous medium at a temperature above 70° C.
9. Process according to claim 8 wherein at least two equivalents of mineral acid are employed.

References Cited in the file of this patent

UNITED STATES PATENTS

| | | |
|---|---|---|
| 2,691,649 | Hammond | Oct. 12, 1954 |
| 2,691,650 | Hammond | Oct. 12, 1954 |
| 2,762,841 | Vassel | Sept. 11, 1956 |
| 2,790,000 | Norman et al. | Apr. 13, 1957 |

FOREIGN PATENTS

| | | |
|---|---|---|
| 550,604 | Belgium | Dec. 16, 1956 |
| 2529/56 | Union of South Africa | Aug. 3, 1956 |

OTHER REFERENCES

Heilbron: Dictionary of Organic Compds., vol. 2, pp. 119–120 (1942), Oxford University Press, N.Y.

Greenberg: Amino Acids and Proteins, p. 10 (1951), Charles T. Thomas, Springfield, Illinois.

Chem. and Eng. News, April 1956, page 2116.